US010344989B2

(12) United States Patent
Im et al.

(10) Patent No.: US 10,344,989 B2
(45) Date of Patent: Jul. 9, 2019

(54) SUPPLY PIPE AND PIPE SYSTEM FOR THERMAL ENERGY NETWORK BASED ON BILATERAL HEAT TRADE

(71) Applicant: Korea Intitute of Energy Research, Daejeon (KR)

(72) Inventors: Yong Hoon Im, Daejeon (KR); Byung Sik Park, Daejeon (KR); Dae Hun Chung, Seoul (KR); Sae Byul Kang, Daejeon (KR); Jae Yong Lee, Seoul (KR); Dong Hyun Lee, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 59 days.

(21) Appl. No.: 14/440,614

(22) PCT Filed: Nov. 16, 2012

(86) PCT No.: PCT/KR2012/009750
§ 371 (c)(1),
(2) Date: May 5, 2015

(87) PCT Pub. No.: WO2014/073726
PCT Pub. Date: May 15, 2014

(65) Prior Publication Data
US 2015/0300656 A1  Oct. 22, 2015

(30) Foreign Application Priority Data

Nov. 8, 2012 (KR) .................. 10-2012-0126294

(51) Int. Cl.
*F24D 3/10* (2006.01)
*F24D 10/00* (2006.01)
(Continued)

(52) U.S. Cl.
CPC .................. *F24D 3/10* (2013.01); *F16L 9/20* (2013.01); *F16L 59/143* (2013.01); *F24D 10/00* (2013.01);
(Continued)

(58) Field of Classification Search
CPC ............. F24D 3/10; F24D 10/00; F24D 19/00
(Continued)

(56) References Cited

U.S. PATENT DOCUMENTS 5,178,324 A * 1/1993 Moesby ................ F24D 10/006
137/455
5,284,204 A * 2/1994 Morgan ................ F16L 11/121
165/219

(Continued)

FOREIGN PATENT DOCUMENTS

CH      703167 A2    11/2011
DE     19632991 C1    1/1998
(Continued)

*Primary Examiner* — Steven B McAllister
*Assistant Examiner* — John E Bargero
(74) *Attorney, Agent, or Firm* — Hammer & Associates, P.C.

(57) ABSTRACT

Provided are a supply pipe and a pipe system that may simultaneously accumulate a plurality of thermal energies having different temperatures in a thermal energy network based on bilateral heat trade. The supply pipe is driven by an operation system, supplies a thermal energy to a user or a heat source, and includes an external pipe, at least two internal pipes that are disposed inside the external pipe and accumulate a thermal energy having a predetermined temperature, and a filler that fills the external pipe inside which the at least two internal pipes are disposed, wherein the at least two internal pipes have thermal energies having different temperatures.

4 Claims, 3 Drawing Sheets

(51) Int. Cl.
*F16L 59/14* (2006.01)
*F16L 9/19* (2006.01)
*F24D 19/00* (2006.01)

(52) U.S. Cl.
CPC ........... *F24D 10/003* (2013.01); *F24D 19/00* (2013.01); *Y02B 30/17* (2018.05); *Y02E 20/14* (2013.01); *Y02P 80/14* (2015.11)

(58) Field of Classification Search
USPC .......................................................... 237/13
See application file for complete search history.

(56) References Cited

U.S. PATENT DOCUMENTS

| | | | | |
|---|---|---|---|---|
| 2004/0153280 | A1* | 8/2004 | Lindgren | F28F 27/02 |
| | | | | 702/130 |
| 2008/0271881 | A1* | 11/2008 | Blecker | F24F 3/06 |
| | | | | 165/254 |
| 2009/0084519 | A1 | 4/2009 | Panula et al. | |

FOREIGN PATENT DOCUMENTS

| | | |
|---|---|---|
| DE | 102008062600 A1 | 7/2009 |
| EP | 0670451 A2 | 9/1995 |
| GB | 1279904 A | 6/1972 |
| JP | 09-178081 A | 7/1997 |
| JP | 2009-530573 A | 8/2009 |
| KR | 20-0280129 Y1 | 6/2002 |
| KR | 10-0937446 B1 | 1/2010 |

\* cited by examiner

SUPPLY PIPE AND PIPE SYSTEM FOR THERMAL ENERGY NETWORK BASED ON BILATERAL HEAT TRADE

CROSS-REFERENCE TO RELATED APPLICATION

This application claims priority to and the benefit of Korean Patent Application No. 2012-0126294, filed on Nov. 8, 2012, the disclosure of which is incorporated herein by reference in its entirety.

BACKGROUND

1. Field of the Invention

The present invention relates to a supply pipe and a pipe system for a thermal energy network, and more particularly, to a supply pipe and a pipe system for a thermal energy network based on bilateral heat trade.

2. Discussion of Related Art

A thermal energy network system is a system in which a heat source and a user supply thermal energy by means of a pipe through which a heat transfer medium is carried. An existing district heating system is a thermal energy network system.

A conventional thermal energy network system is a unilateral thermal energy system in which a supplier unilaterally supplies a thermal energy to a customer by using a limited heat supply method.

Recently, expanding the concept of a unilateral thermal energy network system, A thermal energy network system based on bilateral heat trade has been suggested. In the bilateral thermal energy network system, a supplier supplies a thermal energy to a customer, and when surplus heat is generated at a customer side, the surplus heat of the customer is used.

In general, a pipe network of a thermal energy network system includes a supply pipe that supplies a thermal energy and a return pipe that brings back surplus heat.

The supply pipe supplies a thermal energy having a single temperature according to design.

Accordingly, since the customer receives only thermal energy having the single temperature supplied by the supplier, irrespective of a desired temperature, it is inefficient in terms of energy consumption.

Also, since thermal energy generated by using fossil fuels has a relatively high temperature, whereas a thermal energy generated by using renewable energy or the like has a relatively mid-low temperature, it is difficult to simultaneously accumulate thermal energy having different temperatures in an existing thermal energy network system using a single temperature supply method.

SUMMARY OF THE INVENTION

The present invention is directed to a supply pipe and a pipe system that can simultaneously accumulate a plurality of thermal energies having different temperatures in a thermal energy network based on bilateral heat trade.

According to an aspect of the present invention, there is provided a supply pipe for a thermal energy network based on bilateral heat trade which is driven by an operation system and supplies a thermal energy to a user or a heat source, the supply pipe including: an external pipe; at least two internal pipes that are disposed inside the external pipe and accumulate a thermal energy having a predetermined temperature; and a filler that fills the external pipe inside which the at least two internal pipes are disposed, wherein the at least two internal pipes accumulate thermal energies having different temperatures.

BRIEF DESCRIPTION OF THE DRAWINGS

The above and other objects, features and advantages of the present invention will become more apparent to those of ordinary skill in the art by describing in detail an exemplary embodiment thereof with reference to the accompanying drawings, in which.

DETAILED DESCRIPTION OF EXEMPLARY EMBODIMENT

Figure 1:
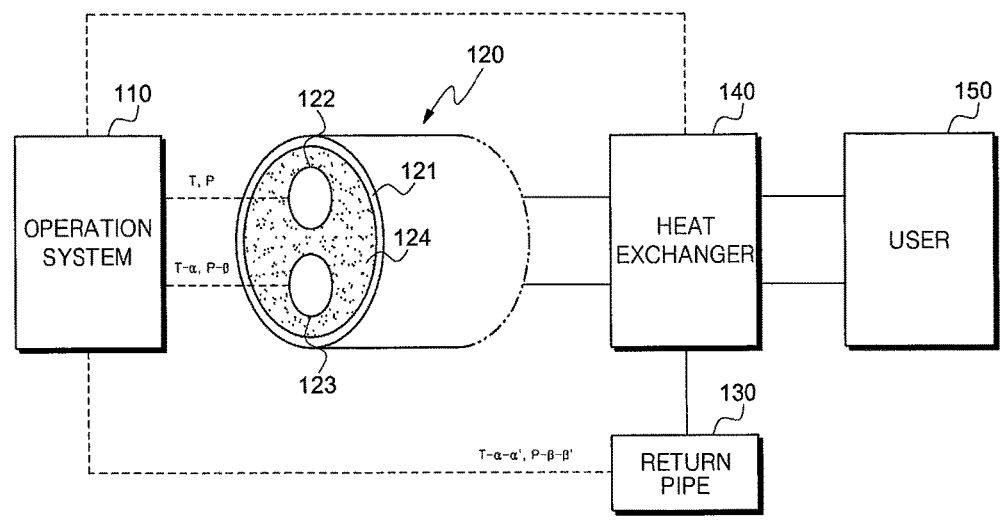
FIG. 1 is a view illustrating a supply pipe and a pipe system for a thermal energy network based on bilateral heat trade, according to an embodiment of the present invention.

An example embodiment of the present invention is described below in sufficient detail to enable those of ordinary skill in the art to embody and practice the present invention. It will be understood that the present invention may be embodied in many alternative forms, is not limited to the example embodiment set forth herein, and covers all modifications, equivalents, and alternatives to the example embodiment that fall within the spirit and scope of the appended claims.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. herein, the term "and/or" includes any and all combinations of one or more referents.

It will be understood that when an element is referred to as being "on," "connected" or "c'oupled" to another element, it can be directly on, connected or coupled to the other element or intervening elements may be present. In contrast, when an element is referred to as being "directly on," "directly connected" or "directly coupled" to another element, there are no intervening elements. Other terms used to describe relationships between elements should be interpreted in a like fashion (i.e., "between" versus "directly between," "adjacent" versus "directly adjacent," etc.).

The terminology used herein to describe an embodiment of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The present invention will now be described more fully with reference to the accompanying drawings, in which an exemplary embodiment of the present invention is shown. Throughout the drawings and the description, parts will be consistently denoted by the same respective reference numerals and described in detail only once.

FIG. 1 is a view illustrating a supply pipe 120 and a pipe system for a thermal energy network based on bilateral heat trade, according to an embodiment of the present invention.

Referring to FIG. 1, the pipe system includes an operation system 110, the supply pipe 120, a return pipe 130, and a heat exchanger 140.

The supply pipe 120 that supplies a thermal energy to a user 150 or receives thermal energy from the user 150 through a purchase or the like includes an external pipe 121, a plurality of internal pipes, for example, first and second internal pipes 122 and 123, and a filler 124.

The first and second internal pipes 122 and 123 are disposed inside the external pipe 121, accumulate thermal energies having different temperatures, and function to supply a thermal energy from a heat source to the user 150 or supply a thermal energy from the user 150 to the heat source.

Although two internal pipes, that is, the first and second internal pipes 122 and 123, are shown in FIG. 1, a plurality of internal pipes that may accumulate thermal energies having different temperatures may be provided. Also, each of the first and second internal pipes 122 and 123 may be a single pipe, or may be formed by combining a plurality of unit pipes. In other words, one internal pipe that accumulates a thermal energy having a predetermined temperature may be formed by grouping a plurality of unit pipes that accumulate thermal energies having the same temperature.

The filler 124 functions to support and fix the first and second internal pipes 122 and 123 in the external pipe 121, and is formed of a heat insulating material to perform a heat insulating function.

In this case, since the first and second internal pipes 122 and 123 accumulate the thermal energies having different temperatures, it is preferable that the first and second internal pipes 122 and 123 are disposed with the filler 124 therebetween in order to prevent thermal interference between the first and second internal pipes 122 and 123.

The return pipe 130 brings back and re-uses a surplus thermal energy from the user 150 or the heat source. Accordingly, the surplus thermal energy of the return pipe 130 has a lower temperature than the thermal energies of the first and second pipes 122 and 123.

The operation system 110 controls the flow of a thermal energy in each pipe at a predetermined operating pressure by driving the supply pipe 120 and the return pipe 130. In addition, the operation system 110 controls an overall operation of the pipe system, for example, an operation of the heat exchanger 140.

Although one operation system 110 drives the supply pipe 120, the return pipe 130, and the heat exchanger 140 in FIG. 1, the present embodiment is not limited thereto and additional operation systems may respectively drive the supply pipe 120, the return pipe 130, and the heat exchanger 140.

The heat exchanger 140 basically supplies a thermal energy to the user 150 through heat exchange between a thermal medium of the user 150 and the thermal energies of the first and second internal pipes 122 and 123 of the heat source. In addition, the heat exchanger 140 functions to supply heat to the user 150 or receive heat from the user 150 through energy exchange between the thermal energies of the first and second internal pipes 122 and 123 of the heat source, the surplus thermal energy of the return pipe 130, and the surplus thermal energy generated on the side of the user 150.

In FIG. 1, since the first and second internal pipes 122 and 123 accumulate the thermal energies having different temperatures, a temperature of a heat transfer medium that is supplied from a high-temperature internal pipe and is used through the heat exchanger 140 according to an operation condition may be higher than a temperature of a low-temperature internal pipe. In this case, even a heat transfer medium that has already passed through the heat exchanger 140 is not brought back by the return pipe 130 and is re-supplied into the low-temperature internal pipe, a temperature of a low-temperature thermal energy is increased, thereby making it possible to re-use a thermal energy that has already been used.

In order to re-use such a surplus thermal energy, the operation system 110 may drive the first and second internal pipes 122 and 123 of the supply pipe 120 that accumulate the thermal energies having different temperatures and the return pipe 130 at different operating pressures.

This is to easily exchange mass by using different pressures, considering that is not easy to mix energies having different properties at the same pressure.

Preferably, an operating pressure of an internal pipe that accumulates a thermal energy having a relatively high temperature may be set to be higher than an operating pressure of an internal pipe that accumulates a thermal energy having a relatively low temperature, to easily mix the thermal energy having the relatively high temperature with the thermal energy having the relatively low temperature, thereby improving utilization efficiency.

In an embodiment, when the first internal pipe 122 accumulates a thermal energy having a temperature of 75° C. and the second internal pipe 123 accumulates a thermal energy having a temperature of 55° C., the operation system 110 may drive the first internal pipe 122 at an operating pressure that is higher than that of the second internal pipe 123.

The operation system 110 may drive the return pipe 130 whose thermal energy has a lower temperature than the first and second internal pipes 122 and 123 at a lower operating pressure than the first and second internal pipes 122 and 123.

Examples of heat exchange performed by the heat exchanger 140 of FIG. 1 will now be explained.

FIGS. 2 through 5 are views illustrating examples of heat exchange.

For convenience of explanation, it is assumed that a temperature T and an operating pressure P of a thermal energy accumulated in the first internal pipe 122 are higher than a temperature T-$\alpha$ and an operating pressure P-$\beta$ of a thermal energy accumulated in the second internal pipe 123. In addition, it is assumed that a temperature T-$\alpha$-$\alpha'$ and an operating pressure P-$\beta$-$\beta'$ of a thermal energy accumulated in the return pipe 130 are lower than the temperature T-$\alpha$ and the operating pressure P-$\beta$ of the thermal energy accumulated in the second internal pipe 123.

Figure 2:
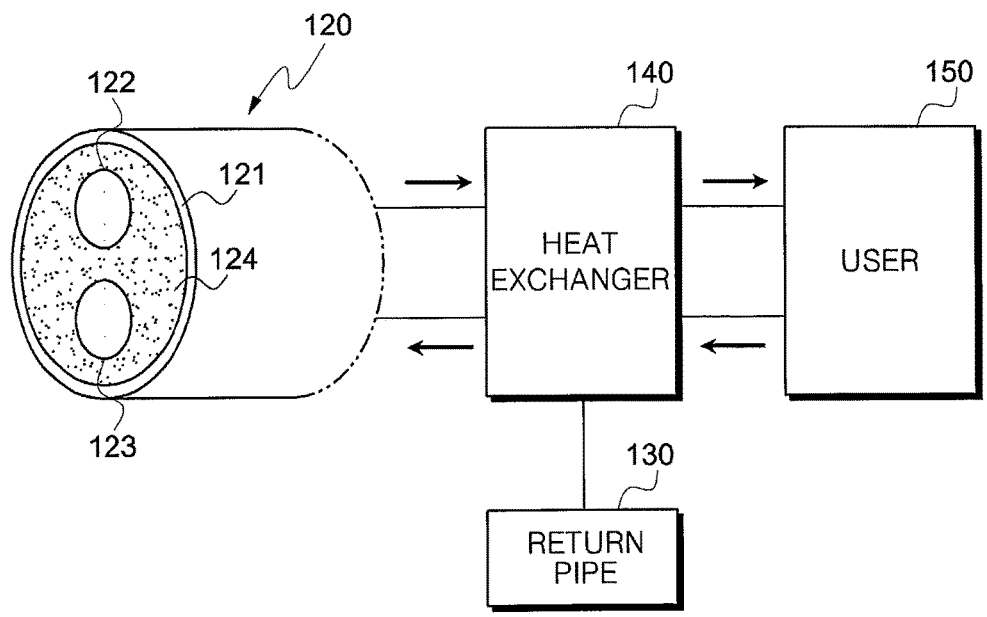
FIGS. 2 through 5 are views for explaining examples of heat exchange.

FIG. 2 is a view illustrating a heat sale mode performed from the heat source to the user 150. In detail, the heat sale mode is a mode in which the thermal energy of the first internal pipe 122 is supplied to the user 150.

The heat sale mode is performed on the condition that a temperature of a heat transfer medium that is brought back after a thermal energy is supplied from the first internal pipe 122 through the heat exchanger 140 to the user 150 is higher than a temperature of a heat transfer medium in the second internal pipe 123.

That is, since a temperature of the heat transfer medium that is brought back after being used is higher than a temperature of the heat transfer medium of the second internal pipe 123, the operation system 110 introduces the brought back heat transfer medium into the second internal pipe 122 whose heat transfer medium has a lower temperature to supply a thermal energy to the second internal pipe 122.

The second internal pipe 122 receiving the thermal energy due to the brought back heat transfer medium may perform a heat sale so that the thermal energy is supplied to the user 150 through the heat exchanger 140 again.

Figure 3:
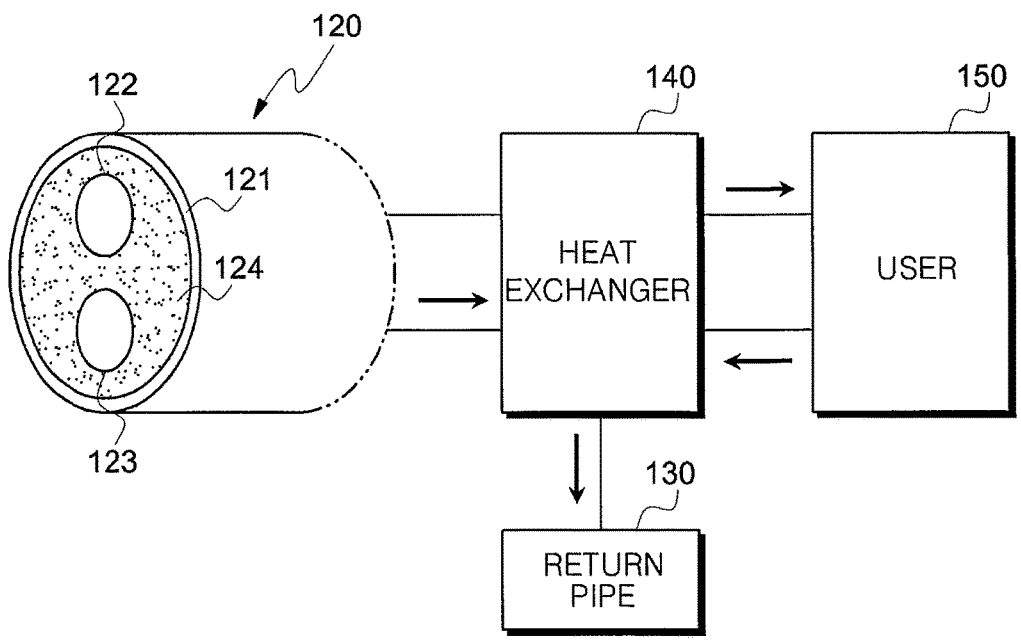

FIG. 3 is a view illustrating a heat sale mode performed from the heat source to the user 150. In detail, the heat sale mode is a mode in which a thermal energy of the second internal pipe 123 is supplied to the user 150.

Although the thermal energy of the second internal pipe 123 has a lower temperature than a thermal energy of the first internal pipe 122, when the user 150 requests a thermal energy having a low temperature, the thermal energy of the second internal pipe 123 having the low temperature may be supplied.

Under the control of the operation system 110, a heat transfer medium is supplied from the second internal pipe 122 to the heat exchanger 140, and heat is supplied to the user 150 through heat exchange through the supplied heat transfer medium. In this case, the operation system 110 controls return by detecting a temperature of the heat transfer medium that is used for the heat exchange.

That is, the heat transfer medium whose temperature is reduced while passing through the heat exchanger 140 is introduced into and brought back by the return pipe 130. Since the temperature T-$\alpha$-$\alpha'$ and the operating pressure P-$\beta$-$\beta'$ of the thermal energy in the return pipe 130 are lower than those of the second internal pipe 123, the thermal energy of the second internal pipe 123 may be easily introduced into the return pipe 130.

Figure 4:
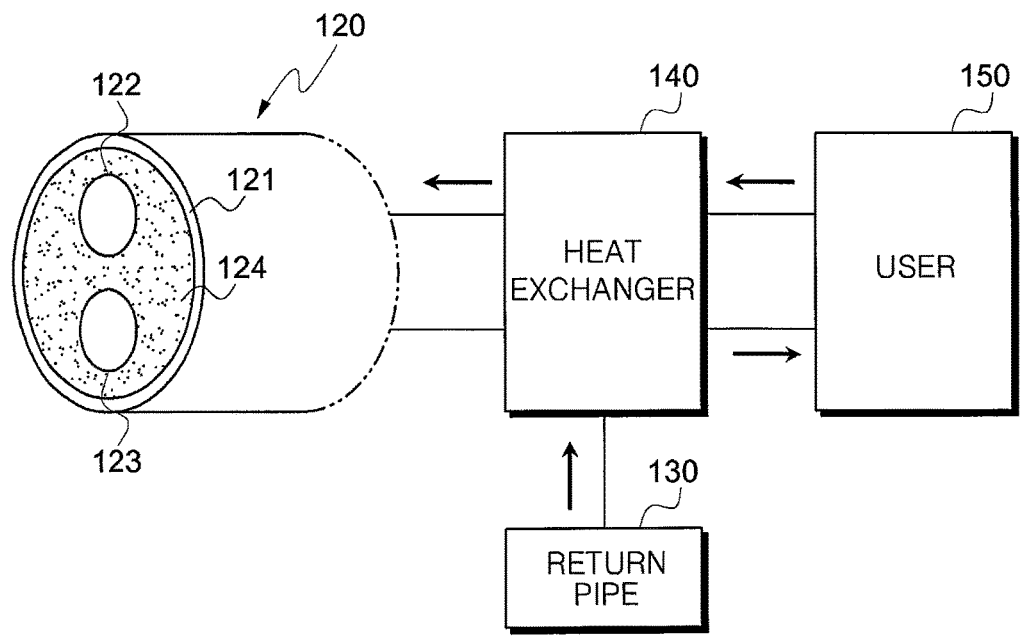

FIG. 4 is a view illustrating a heat purchase mode performed from the user 150 to the heat source. In detail, the heat purchase mode is a mode in which a thermal energy of the user 150 is supplied to the first internal pipe 122.

That is, the heat purchase mode is a mode performed when a surplus thermal energy having a high temperature is generated by a heat source unit of the user 150 and the heat source purchases the surplus thermal energy from the user 150.

The surplus thermal energy having the high temperature that is generated by the heat source unit of the user 150 is subjected to heat exchange with a heat transfer medium of the return pipe 130 of the heat source through the heat exchanger 140, and the heat transfer medium having an increased temperature is transferred to the supply pipe 120 of the heat source.

The operation system 110 detects the increased temperature of the heat transfer medium. When the increased temperature is within a range of operation temperatures of the first internal pipe 122, the heat transfer medium is introduced into the first internal pipe 122. A range of temperatures of a heat transfer medium that may be introduced into the first internal pipe 122 may be variously set according to needs. For example, the heat transfer medium may be introduced only when the heat transfer medium is within a preset range of operation temperatures of the first internal pipe 122.

In this case, since the first internal pipe 122 has a higher pressure than the return pipe 130, the operation system 110 may increase the pressure of the return pipe 130 and enable the heat transfer medium of the return pipe 130 to be easily introduced into the first internal pipe 122.

In an embodiment, the operation system 110 may offset a pressure difference between the first internal pipe 122 and the return pipe 130 by using an additional pressure pump.

Figure 5:
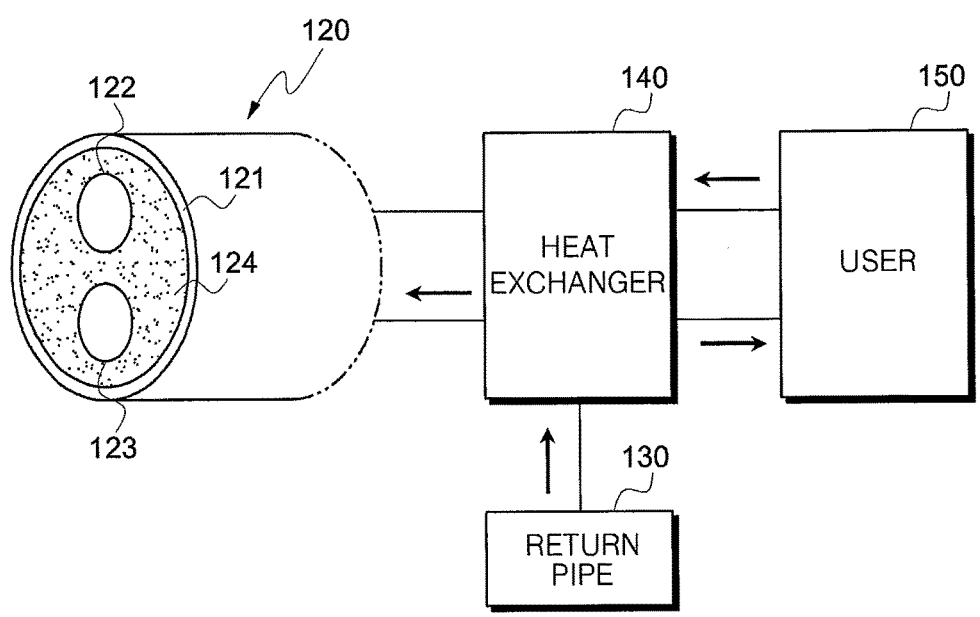

FIG. 5 is a view illustrating a heat purchase mode performed from the user 150 to the heat source. In detail, the heat purchase mode is a mode in which a thermal energy of the user 150 is supplied to the second internal pipe 122.

That is, the heat purchase mode is a mode performed when a surplus thermal energy is generated by the heat source unit of the user 150 and the heat source purchases the surplus thermal energy from the user 150.

The surplus thermal energy generated by the heat source unit of the user 150 is subjected to heat exchange with a heat transfer medium of the return pipe 130 of the heat source through the heat exchanger 140, and the heat transfer medium having an increased temperature is transferred to the supply pipe 120 of the heat source.

The operation system 110 detects the increased temperature of the heat transfer medium. When the increased temperature is within a range of operation temperatures of the second internal pipe 123, the heat transfer medium is introduced into the second internal pipe 123. A range of temperatures of a heat transfer medium that may be introduced into the second internal pipe 123 may be variously set according to needs. For example, the heat transfer medium may be introduced only when the heat transfer medium is within a preset range of operation temperatures of the second internal pipe 123.

In this case, since the second internal pipe 123 has a higher pressure than the return pipe 130, the operation system 110 may increase the pressure of the return pipe 130 and enable the heat transfer medium of the return pipe 130 to be easily introduced into the second internal pipe 123.

In an embodiment, the operation system 110 may offset a pressure difference between the second internal piper 123 and the return pipe 130 by using an additional pressure pump.

Although not shown, the operation system 110 may measure a temperature of a thermal energy in a pipe by using a temperature sensor that is provided in each pipe, and may control transfer of a heat transfer medium between the pipes by using a valve that connects the pipes.

According to the present invention, since a plurality of internal pipes that accumulate thermal energies having different temperatures are disposed in an external pipe of a supply pipe, the thermal energies having different temperatures can be simultaneously used in one thermal energy network system.

Accordingly, a supplier can simultaneously supply thermal energies having various temperatures, and a user can selectively receive a thermal energy having a desired temperature.

Also, since the internal pipes are driven at different operating pressures, it is very easy to mix the thermal energies having different temperatures.

In addition, according to the present invention, when heat of a high-temperature heat transfer medium remaining after heat exchange is still useful, since a pipe system that operates at a plurality of supply temperatures can reuse the heat in multi-steps according to temperatures instead of discarding the heat to a return pipe, heat utilization efficiency can be improved.

While the present invention has been particularly shown and described with reference to an exemplary embodiment thereof, it will be understood by those of ordinary skill in the art that various modifications can be made to the described embodiment without departing from the scope of the present invention as defined by the appended claims.

What is claimed is:

1. A pipe system for a thermal network based on bilateral heat trade, the pipe system comprising:
    a supply pipe that supplies a thermal energy to a user or a heat source;
    a return pipe that brings back a surplus thermal energy from the user or the heat source;
    an operation system that drives the supply pipe and the return pipe; and
    a heat exchanger that is driven under the control of the operation system wherein the supply pipe comprises:
        an external pipe;
        a first internal pipe that is disposed inside the external pipe and accumulates a thermal energy having a first temperature;
        a second internal pipe that is disposed inside the external pipe and accumulates a thermal energy having a second temperature that is different from the first temperature; and
        a filler that fills the external pipe inside which the first and second internal pipes are disposed,
    wherein the operation system drives the first internal pipe at a first operating pressure, and the second internal pipe at a second operating pressure that is different from the first operating pressure,
    wherein the surplus thermal energy of the return pipe has a temperature lower than the first and second temperatures,
    wherein the heat exchanger supplies the thermal energy having the first temperature or the thermal energy having the second temperature to the user,
    wherein the heat exchanger performs heat exchange between at least two of the thermal energy having the first temperature, the thermal energy having the second temperature, and the surplus energy to obtain an exchanged thermal energy,
    wherein the heat exchanger supplies the exchanged thermal energy to any one of the first internal pipe, the second internal pipe, and the return pipe.

2. The pipe system of claim 1, wherein the operation system drives the return pipe at a third operating pressure that is lower than the first and second operating pressures.

3. The pipe system of claim 2, wherein the first temperature is higher than the second temperature, and the first operating pressure is higher than the second operating pressure.

4. The supply pipe of claim 1, wherein the filler is formed of a heat insulating material.

* * * * *